(12) United States Patent
Ericson et al.

(10) Patent No.: US 9,642,026 B2
(45) Date of Patent: May 2, 2017

(54) METHODS AND DEVICES FOR REPORTING A DOWNLINK CHANNEL QUALITY

(75) Inventors: Mårten Ericson, Luleå (SE); Bengt Lindoff, Bjärred (SE); Stefan Parkvall, Stockholm (SE); Mats Sågfors, Kyrkslätt (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 176 days.

(21) Appl. No.: 14/119,254

(22) PCT Filed: Feb. 17, 2012

(86) PCT No.: PCT/EP2012/052769
§ 371 (c)(1),
(2), (4) Date: Feb. 10, 2014

(87) PCT Pub. No.: WO2012/167957
PCT Pub. Date: Dec. 13, 2012

(65) Prior Publication Data
US 2014/0192664 A1    Jul. 10, 2014

Related U.S. Application Data

(60) Provisional application No. 61/494,653, filed on Jun. 8, 2011.

(51) Int. Cl.
*H04L 12/26*    (2006.01)
*H04W 24/08*    (2009.01)
(Continued)

(52) U.S. Cl.
CPC ........... *H04W 24/08* (2013.01); *H04W 24/10* (2013.01); *H04W 72/04* (2013.01); *H04W 88/06* (2013.01)

(58) Field of Classification Search
CPC ..... H04W 24/08; H04W 24/10; H04W 72/04; H04W 88/06; H04W 72/085;
(Continued)

(56) References Cited

U.S. PATENT DOCUMENTS

2005/0265381 A1* 12/2005 Kim et al. .................. 370/464
2006/0205396 A1*  9/2006 Laroia et al. ............. 455/422.1
(Continued)

FOREIGN PATENT DOCUMENTS

CN    101296021    * 10/2008
WO    2011044526 A1   4/2011

OTHER PUBLICATIONS

Machine translation of CN101296021.*
(Continued)

*Primary Examiner* — Kwang B Yao
*Assistant Examiner* — Harun Chowdhury
(74) *Attorney, Agent, or Firm* — Coats & Bennett, PLLC

(57) ABSTRACT

The invention relates to a method (90) in a user equipment (4) for reporting a downlink channel quality in a communication system (1) comprising a first radio access technology system (2) and a second radio access technology system (3). The user equipment (4) is in connection with a primary serving cell on the first radio access technology system (2) and with a secondary serving cell on the second radio access technology system (3). The method (90) comprises: determining (110) channel quality for the second radio access technology system (3) using an indicator format of the radio access technology of the second radio access technology system (3); mapping (120) an indicator of the channel quality having the indicator format of the second radio access technology to an indicator format used for channel quality indicators in the first radio access technology system (2); and transmitting (130) the indicator of the channel
(Continued)

quality for the second radio access technology system (3) to the communication system (1) using the indicator format of the first radio access technology on an uplink carrier of the first radio access technology system (2). The invention also relates to a user equipment, methods in a network node and a network node.

29 Claims, 7 Drawing Sheets

(51) Int. Cl.
*H04W 24/10* (2009.01)
*H04W 72/04* (2009.01)
*H04W 88/06* (2009.01)

(58) Field of Classification Search
CPC . H04W 72/0413; H04W 88/10; H04W 36/30; H04L 1/0003
USPC ........... 370/252, 328, 329, 332; 455/73, 437
See application file for complete search history.

(56) References Cited

U.S. PATENT DOCUMENTS

| | | | |
|---|---|---|---|
| 2007/0259671 A1* | 11/2007 | Cheng et al. | 455/452.2 |
| 2008/0161003 A1* | 7/2008 | Brueck | H04W 36/30 455/437 |
| 2010/0067433 A1 | 3/2010 | Cheng et al. | |
| 2010/0074195 A1* | 3/2010 | Cheng | H04L 1/0003 370/329 |
| 2012/0289170 A1* | 11/2012 | Li et al. | 455/73 |
| 2013/0028307 A1* | 1/2013 | Ren et al. | 375/224 |

OTHER PUBLICATIONS

Qualcomm Europe, "CQI Feedback for Multicarrier Operation", 3GPP TSG RAN WG1 #58bis, Oct. 12, 2009, pp. 1-4, R1-094207, 3GPP, Japan.

\* cited by examiner

METHODS AND DEVICES FOR REPORTING A DOWNLINK CHANNEL QUALITY

TECHNICAL FIELD

The technology disclosed herein relates generally to the field of wireless communication systems, and in particular to reporting of downlink channel quality within such wireless communication systems.

BACKGROUND

Today, there are many radio and cellular access technologies and standards such as GSM/GPRS, WCDMA/HSPA (Wideband Code Division Multiple Access/High Speed Packet Access), CDMA (Code Division Multiple Access)-based technologies, WiFi (Wireless Fidelity), WiMAX (Worldwide Interoperability for Microwave Access) and recently LTE (Long Term Evolution), to name a few. The technologies and standards have been developed during the last few decades, and it can be expected that the development will continue. Specifications are developed in organizations like 3GPP, 3GPP2 and IEEE. 3GPP is responsible for the development and maintenance of GSM/GPRS, WCDMA/HSPA and LTE standards.

Various frequency bands are typically allocated and/or sold by government organizations, such that an operator may "own" certain bands for a particular use (i.e. the right to use the band in a certain way). Regulations may specify that the owner, i.e. the operator, should deploy a particular technology in a particular frequency band. In some cases, the operator may be able to choose what technology and standard to deploy in their spectrum provided the choices fulfill certain criteria set up by e.g. the ITU (International Telecommunications Union).

As a consequence of the fact that spectrum is a scarce resource, an operator may have the rights to deploy a new cellular access, such as LTE, in a limited spectrum of, say 20 MHz.

However, the fact that the operator may have an existing customer base with existing terminals will prevent the operator from deploying only one technology in the whole spectrum owned by the operator. This could be the case e.g. for an operator that has a large customer base with WCDMA/HSPA subscriptions using the Universal Terrestrial Radio Access Network (UTRAN), and the operator wants to deploy the most recent evolution, the Long Term Evolution (LTE) of UTRAN, also called Evolved-UTRAN (E-UTRAN).

In this example, the operator may then have to divide the available bands between HSPA and LTE. At initial deployment of LTE, the operator may thus continue to use e.g. 10 MHz (corresponding to two WCDMA carriers) with HSPA and reserve 10 MHz for initial LTE deployment.

However, such partitioning of the scarce spectrum to different technologies has some undesired effects on performance:

There is a direct correlation between the peak-rate that can be offered and the spectrum width that is used. Thus, limiting the bandwidth of both HSPA and LTE to 10 MHz in the example above will roughly limit the peak-rate offered to customers to a half. Thus, assuming now, for the sake of illustration, that the technologies can offer around 100 Mbps in 20 MHz, it will mean that the peak-rate will now be limited to around 50 Mbps in each of the technologies.

Initially, it may happen that the HSPA carriers are very loaded, while the LTE carriers in the example only have a few users. Thus, there would be an imbalance between allocation and usage resulting in undesired congestion on the HSPA carriers. However, in order to offer a decent bit-rate on the LTE carriers, it is still not possible to allocate e.g. only 5 MHz to LTE customers, since then LTE would not provide competitive performance in relation to HSPA.

There have been discussions to find a solution for simultaneous use of multiple radio access technologies (LTE+HSPA carrier aggregation), such that higher peak rates and load balancing can be offered in heterogeneous deployments including at least two radio-access technologies. Both LTE carrier aggregation (CA) as well as HSPA carrier aggregation, i.e. carrier aggregation within the same RAT, is defined in the Release 10 standard of the 3GPP specification. In fact HSPA CA is defined already in Release 9.

SUMMARY

Carrier aggregation (CA), wherein a combination or aggregation of two independent carriers is made, is one way of achieving increased resource utilization and spectrum efficiency. For example, in LTE+HSPA carrier aggregation, each carrier is an LTE carrier or a HSPA carrier. For such LTE+HS carrier aggregation one possibility is that a mobile terminal, or a wireless device or a user equipment (UE) is in connection to a primary serving cell on a primary/first RAT (for instance HSPA) on a first carrier and a secondary/second serving cell on a second RAT (for instance LTE) on a second carrier, i.e. in a similar way as primary and secondary cell are defined on intra RAT (such as for either LTE or HS) carrier aggregation. It is possible that one of the RATS and systems is considered as being the one in control of the UE, while the carrier or carriers on the other system (or RAT) is considered as a performance "booster", in the sense that such "secondary" carriers are added to enhance the performance. For example, UTRAN/HSPA could be the primary system/RAT, while E-UTRAN/LTE may be the secondary system/RAT. In a possible configuration situation, it could happen e.g. that a user equipment (UE) is first connected to UTRAN/HSPA, and then later, the UE is configured to add carriers on LTE/E-UTRAN. LTE is then a secondary RAT, i.e. the connection control remains in UTRAN, even if some LTE carriers or cells are added to "boost" the performance. Of course, it is also possible with a configuration such that E-UTRAN/LTE acts as the primary system/RAT, and UTRAN/HSPA is the secondary system/RAT.

In some scenarios one can expect that the carrier aggregation only is made for carriers in the downlink (DL), and hence a single RAT (typically corresponding to the primary RAT) is used for the carriers in the uplink (UL). Carrier aggregation for carriers in the downlink may be easier to implement, as there then is no requirement for a UE to transmit on multiple carriers using different radio access technologies on the UL. Simultaneous transmission on several carriers can be rather complex, since a UE may have a maximum output power that then needs to be distributed on both carriers. An UE transmitting on multiple carriers may also have to comply with various emission criteria, such as the SAR (Specific Absorption Rate (SAR), which is a measure of the amount of radio frequency (RF) energy absorbed by the body when using an UE.

It may also be the case that carrier aggregation in the DL is more urgent, in case the traffic load is biased towards downlink data traffic (as opposed to uplink data traffic dominance).

However, introducing only carrier aggregation for carriers in the DL would also introduce a new set of problems, since there is some control information, or feedback information, related to the downlink carriers, that needs to be transmitted on the uplink carrier or carriers. Thus, if the UL carrier or carriers are configured with only one RAT, hence there is no uplink carrier configured with the other one of the radio access technologies. There is currently no method for how to transmit the control information associated with that other radio access technology.

In this case feedback information, like acknowledgment/negative acknowledgment (ACK/NAK) signaling and channel quality indicator (CQI) reports for the secondary RAT may need to be reported using the primary RAT UL (assuming here, that the secondary RAT is not configured with any UL).

HARQ ACK/NAK stands for Hybrid ARQ acknowledgements and negative acknowledgements. HARQ with ACK/NACKs are implemented both in HSPA and LTE, using binary feedback related to the successful or non-successful reception of a related data unit (transport block). This is known art, and HARQ and ACK/NAK will not be described in further detail herein.

CQI stands for Channel Quality Indicator and is a quality parameter describing the estimated quality of the downlink channel, such that the downlink transmitter or network node (such as a Radio Base Station, RBS) can decide e.g. what coding, modulation, power or frequency to use in an upcoming transmission. The UE monitors the downlink quality, and reports a CQI parameter to the network. Both HSPA and LTE implements CQI, though there are differences in the way CQI can be configured, and what information the report may contain.

In case the UL carrier or carriers are configured with the primary RAT only, the CQI reports for the secondary RAT need to be transported using the primary RAT. This implies that, if CQI reports related to the secondary RAT should be made available to the network, they have to be transmitted to the network in by some non-conventional means. No solution is known in the art and therefore there is a need for method and apparatus solving this problem.

Thus, there is a need to overcome the aforementioned problems, to which the present disclosure provides solutions through the embodiments described below.

An object of the invention is to overcome or at least alleviate one or more of the above mentioned problems.

The object is, according to a first aspect of the invention, achieved by a method in a user equipment for reporting a downlink channel quality in a communication system comprising a first radio access technology system and a second radio access technology system. The user equipment is in connection with a primary serving cell on the first radio access technology system and with a secondary serving cell on the second radio access technology system. The method comprises: determining channel quality for the second radio access technology system using an indicator format of the radio access technology of the second radio access technology system; mapping an indicator of the channel quality having the indicator format of the second radio access technology to an indicator format used for channel quality indicators in the first radio access technology system; and transmitting the indicator of the channel quality for the second radio access technology system to the communication system using the indicator format of the first radio access technology on an uplink carrier of the first radio access technology system.

The invention enables reporting of downlink channel quality measured in a radio access technology for which there is no uplink carrier configured.

In an embodiment, the mapping comprises adapting the indicator format of the radio access technology of the second radio access technology system to the indicator format used for channel quality indicator in the first radio access technology system.

In an embodiment, the determining of channel quality comprises estimating channel quality for the second radio access technology system.

In an embodiment, the method comprises determining channel quality for the first access technology system. Further, the transmitting of the indicator of the channel quality for the second radio access technology system comprises transmitting also an indicator of the channel quality for the first radio access technology system, wherein the indicator of channel quality for the first radio access technology system and the indicator of the channel quality for the second radio access technology system are time multiplexed on an uplink channel of the first radio access technology system.

In an embodiment, a number of channel quality indicator indices for the second radio access technology system is larger than a number of channel quality indicator indices for the first radio access technology system. The determining of channel quality comprises estimating a channel quality indicator index for the second radio access technology system, resulting in a first channel quality indicator index; and the mapping comprises quantizing the first channel quality indicator index to a quantized channel quality indicator table for the second radio access technology system, having the same or less amount of indices as the first radio access technology system.

In an embodiment, a number of channel quality indicator indices for the second radio access technology system is larger than a number of channel quality indicator indices for the first radio access technology system. The mapping comprises using an extended uplink transmission structure of the first radio access technology system for handling the larger number of indices required for the second radio access technology system.

In a variation of the above embodiment, using the extended uplink transmission structure comprises increasing a code rate of error correcting code used for a channel quality indicator.

In a variation of the above embodiment, the method further comprises increasing the transmission power for compensating for an increased error probability due to the increased code rate.

In another variation, using the extended uplink transmission structure comprises one of: lowering a spreading factor, using multiple uplink resources or increasing the duration of the transmission, increasing the duration of the transmission by transmitting some of a number of channel quality indicator indices in one sub-frame and the remaining channel quality indicator indices in another sub-frame.

In an embodiment, the number of channel quality indicator indices of the second radio access technology system is equal to the number of channel quality indicator indices of the first radio access technology system, and the mapping comprises: using the indicator of the channel quality having the indicator format of the second radio access technology as is.

The object is, according to a second aspect of the invention, achieved by a user equipment configured to operate in a communication system comprising a first radio access technology system and a second radio access technology system. The user equipment is configured for connection with a primary serving cell on the first radio access technology system and with a secondary serving cell on the second radio access technology system. The user equipment is configured to: determine channel quality for the second radio access technology system by using an indicator format of the radio access technology of the second radio access technology system; map an indicator of channel quality having the indicator format of the second radio access technology to an indicator format used for channel quality indicators in the first radio access technology system; and transmit the indicator of the channel quality for the second radio access technology system to the communication system by using the indicator format of the first radio access technology on an uplink carrier of the first radio access technology system.

In an embodiment, the user equipment is configured to map by adapting the indicator format of the radio access technology of the second radio access technology system to the indicator format used for channel quality indicator in the first radio access technology system.

In an embodiment, the user equipment is configured to determine the channel quality by estimating channel quality for the second radio access technology system.

In an embodiment, the user equipment is configured to determine channel quality estimates for the first access technology system; and wherein the user equipment is configured to transmit the indicator of the channel quality for the second radio access technology system by transmitting also an indicator of the channel quality for the first radio access technology system, wherein the indicator of channel quality for the first radio access technology system and the indicator of the channel quality for the second radio access technology system are time multiplexed on an uplink channel for the first radio access technology system.

In an embodiment, a number of channel quality indicator indices for the second radio access technology system is larger than a number of channel quality indicator indices for the first radio access technology system. The user equipment is configured to determine the channel quality by estimating a channel quality indicator index for the second radio access technology system, resulting in a first channel quality indicator index; and wherein user equipment is configured to map by quantizing the first channel quality indicator index to a quantized channel quality indicator table for the second radio access technology system, having the same or less amount of indices as the first radio access technology system.

In an embodiment, a number of channel quality indicator indices for the second radio access technology system is larger than a number of channel quality indicator indices for the first radio access technology system. The user equipment is configured to map by using an extended uplink transmission structure of the first radio access technology system for handling the larger number of indices required for the second radio access technology system.

In a variation of the above embodiment, the user equipment is configured to use the extended uplink transmission structure by increasing a code rate of error correcting code used for a channel quality indicator.

In a variation of the above embodiment, the user equipment further being configured to increase the transmission power for compensating for an increased error probability due to the increased code rate.

In another variation, the user equipment is configured to use the extended uplink transmission structure by: lowering a spreading factor, using multiple uplink resources or increasing the duration of the transmission, or increasing the duration of the transmission by transmitting some of the channel quality indicator indices in one sub-frame and the remaining channel quality indicator indices in another sub-frame.

In an embodiment, the number of channel quality indicator indices of the second radio access technology system is equal to the number of channel quality indicator indices of the first radio access technology system. The user equipment is configured to map by using the indicator of the channel quality having the indicator format of the second radio access technology as is.

The object is, according to a third aspect of the invention, achieved by a method in a network node of a communication system comprising a first radio access technology system and a second radio access technology system. A user equipment is in connection with a primary serving cell on the first radio access technology system and with a secondary serving cell on the second radio access technology system. The method comprises receiving a report of channel quality from the user equipment, in which report an indicator of the channel quality having the indicator format of the second radio access technology is mapped to an indicator format used for channel quality indicators in the first radio access technology system, and determining whether the report of channel quality relates to the first radio access technology system or to the second radio access technology system.

In an embodiment, the method further comprises making, for a report of channel quality relating to the second radio access technology system, a mapping of the channel quality indicator of the second radio access technology system for determining the channel quality indicator for the second radio access technology system.

In an embodiment, the mapping is an inverse mapping.

In an embodiment, the determining whether the report of channel quality relates to the first radio access technology system or to the second radio access technology system is based on timing, code and/or frequency allocation.

The object is, according to a fourth aspect of the invention, achieved by a network of a communication system comprising a first radio access technology system and a second radio access technology system. A user equipment is in connection with a primary serving cell on the first radio access technology system and with a secondary serving cell on the second radio access technology system. The network node is configured to receive a report of channel quality from the user equipment, in which report an indicator of the channel quality having the indicator format of the second radio access technology is mapped to an indicator format used for channel quality indicators in the first radio access technology system; and determine whether the report of channel quality relates to the first radio access technology system or to the second radio access technology system.

In an embodiment, the network node is further configured to make, for a report of channel quality relating to the second radio access technology system, an mapping of the channel quality indicator of the second radio access technology system for determining the channel quality indicator for the second radio access technology system.

In an embodiment, the mapping is an inverse mapping.

In an embodiment, the network node is configured to determine whether the report of channel quality relates to the first radio access technology system or to the second radio access technology system based on timing, code and/or frequency allocation.

Further features and advantages of the invention will become clear upon reading the following description and the accompanying drawings.

DETAILED DESCRIPTION

Figure 1:
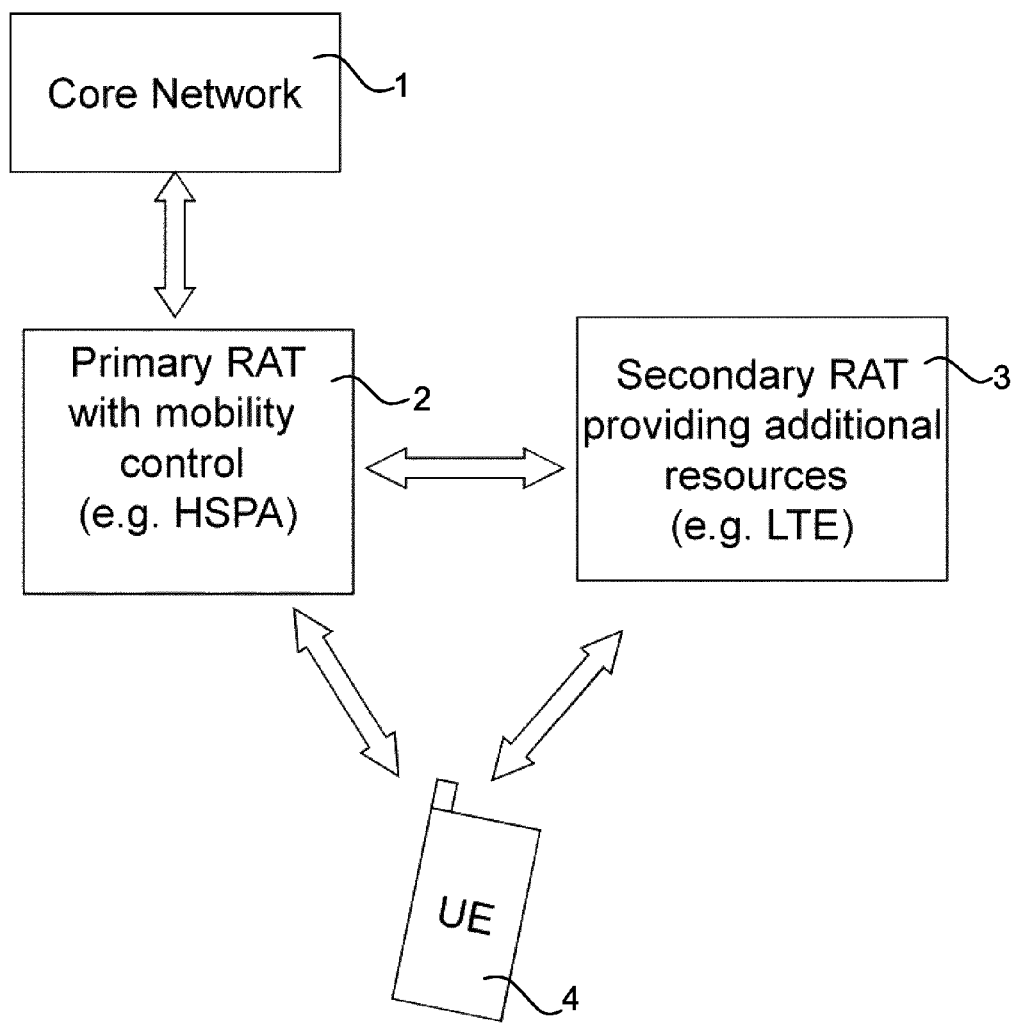
FIG. 1 exemplifies aggregation with a primary system and secondary system.

In the following description, for purposes of explanation and not any limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In this disclosure, the primary focus is on the HSPA-evolution built on the WCDMA radio access also called UTRAN, and LTE, which is based on OFDM and SC-FDMA, also recognized as the Long Term Evolution of UTRAN, or E-UTRAN. Detailed UTRAN radio access specifications are described in the 25-series of 3GPP specifications, while E-UTRAN specifications are found in the 36-series. LTE was introduced in 3GPP Release 8, but the development and future evolution of both HSPA and LTE continues in parallel in Release 9, 10 and so on.

Briefly, a basic concept of the present invention is to provide a solution to the earlier mentioned problems. Embodiments for mapping CQI for a secondary RAT on a primary RAT uplink are described.

In a first embodiment, where the CQI indices for the secondary RAT is different than the number of CQI indices for the primary RAT a Quantized CQI index for the secondary RAT is determined and then transmitted using the same transmission structure (coding, modulation, etc.) as for the primary RAT.

In another embodiment, an extended CQI transmission structure is introduced in the primary RAT for enabling possibility to transmit CQI for the secondary RAT.

In addition, methods for multiplexing CQI reports from the primary and secondary RATs on a same uplink are provided. These methods can be used in combination with the two embodiments above.

Regarding the carrier aggregation set-up, examples of which were given earlier, various possible future scenarios apply, and should not be seen as limiting the applicability of embodiments of the present invention. In FIG. 1, for the sake of illustration, one possible solution is outlined where HSPA is acting as the first or primary system and RAT 2 and LTE is the second or secondary system and RAT 3. In such a situation, it is possible that e.g. mobility is controlled by the primary system and RAT, as further described below. A communication system 1 or communication network thus comprises the primary radio access technology system 2 and the secondary radio access technology system 3. Further, a user equipment 4 or wireless device receives on at least one downlink carrier on the first radio access technology system 2 and on at least one downlink carrier on the second radio access technology system 3. In the FIG. 1, the communication system 1 is illustrated to comprise also a core network 5, associated with the primary RAT 2.

It is noted that the present invention is not limited to these exemplary technologies, but embodiments of the invention are equally applicable to any combination of accesses, as will be further explained below. For example, the RATs may comprise LTE and WLAN or HSPA and WLAN or any other radio access technologies.

Figure 2:
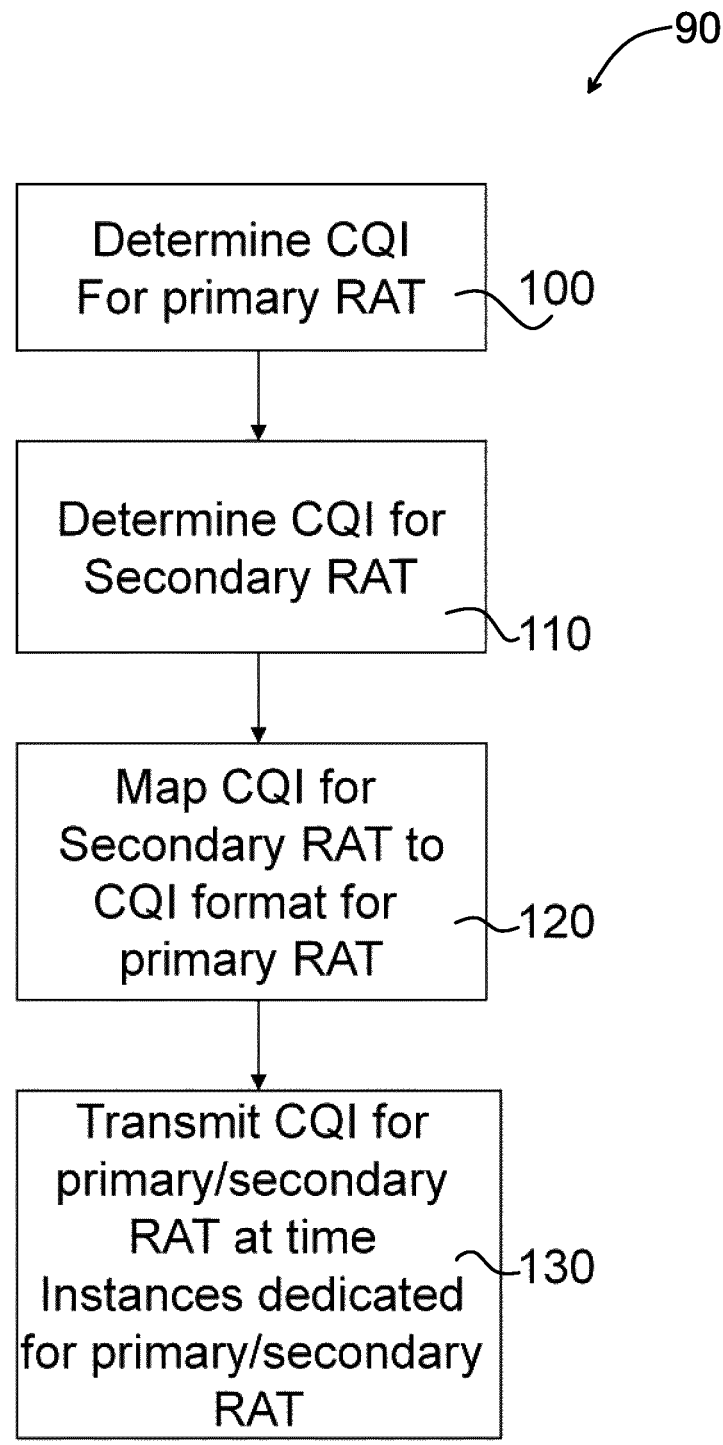
FIG. 2 is a flowchart of methods implemented in a mobile terminal, wireless device or a user equipment.

FIG. 2 shows a flow chart of a basic principle of the invention. The user equipment (UE) 4 or terminal is in connection with a primary serving cell on a primary RAT 2, or differently stated in connection with a network node serving a primary cell using a primary RAT 2. The UE 4 is also in connection with a secondary serving cell on a secondary RAT 3, or differently stated in connection with a network node serving a secondary cell using a secondary RAT 3. Furthermore only the primary serving cell and primary RAT 2 is configured for the UL carrier or carriers. Therefore CQI reports (from the UE to the network node on the UL) for the secondary RAT 3, are, in accordance with embodiments of the invention, signaled via UL carrier or carriers on the primary RAT 2. The user equipment 4 does, on regular basis, CQI estimates for the primary RAT 2 (step 100) and secondary RAT 3 (step 110), according to known principles for respective RAT 2, 3. The regularity may be according to information received by higher layer signaling from the network node. For instance, pilot symbols are used for estimating a received Signal-to-Interference ratio (SIR) and then the SIR is mapped to a CQI index corresponding to possible modulation and coding scheme possible to support under the current radio characteristics. The CQI index for the primary RAT 2 can be fed back using the already present transmission structures in the primary RAT uplink. Then, in step 120, the CQI index for the secondary RAT 3, determined using secondary RAT 3 principles, is mapped to a CQI format used for CQI reports for the primary RAT 2 Different embodiments are described below. Then, in step 130, the CQI reports for the primary and secondary RAT 2, 3 are transmitted to the network node, conveniently in a time multiplexed fashion, although frequency or code multiplexing (or combinations of the three multiplexing schemes) could be used. The network node then reacts accordingly.

Figure 3:
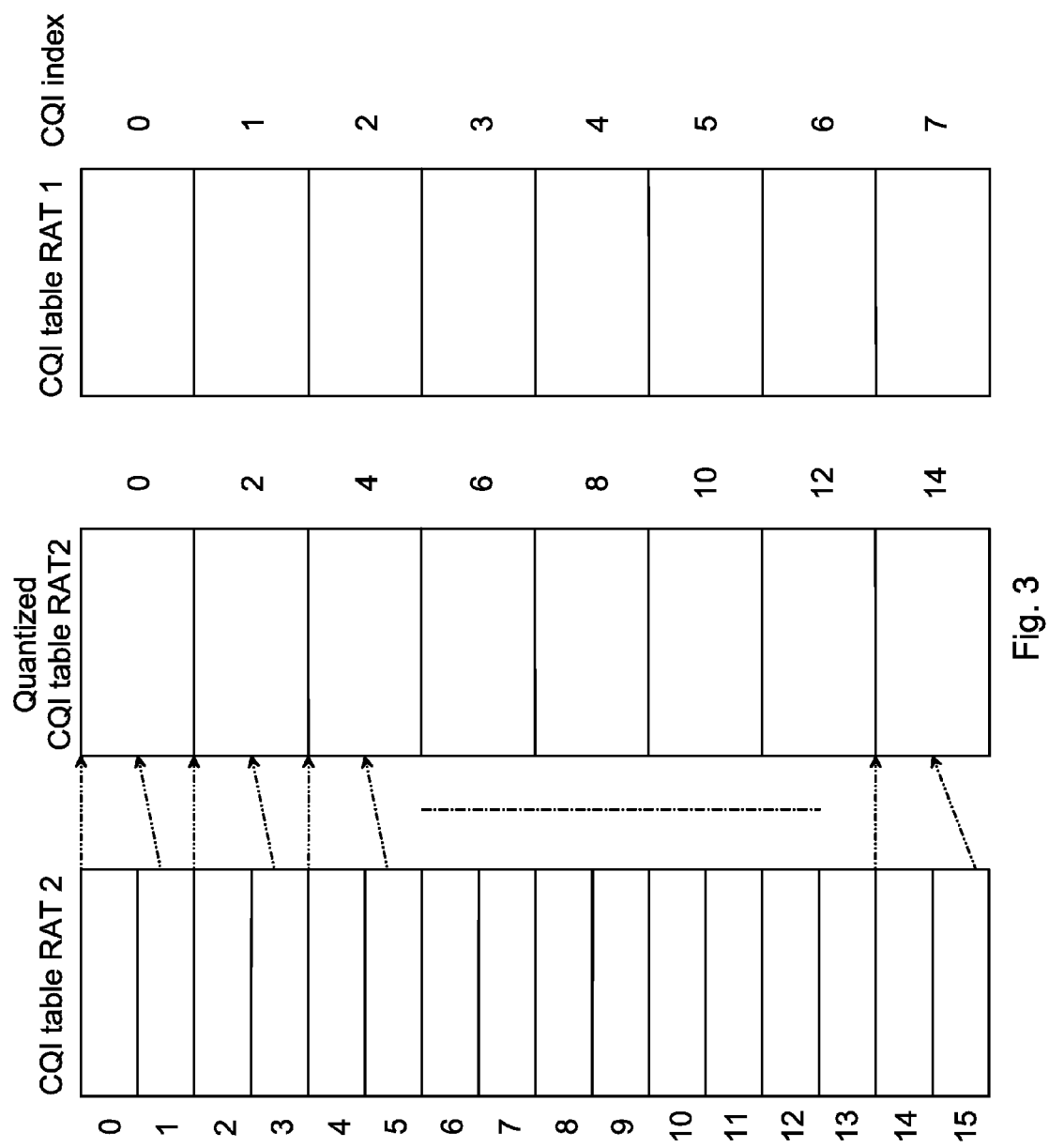
FIG. 3 illustrates quantization of CQI index.

FIG. 3 illustrates quantization of CQI index for the secondary RAT 3 to fit CQI format of the primary RAT 2. In particular, FIG. 3 shows an embodiment of the mapping in case the number of CQI indices for the secondary RAT 3 is larger than the number of CQI indices for the primary RAT 2. For instance, LTE has 15 different CQI indices, while HSPA has 31 different CQI indices. In this case, the different indicator formats or CQI formats imply that the format for reporting CQI of the secondary RAT has more bits available for reporting CQI compared to the number of bits available in the CQI format used in the primary RAT.

In this case, the CQI index for the secondary RAT 3 (in this example being HSPA) is estimated according to prior art techniques, giving a certain CQI index (0 to 30). This CQI index is then quantized to a quantized CQI (QCQI) index table for the secondary RAT 3, having the same (or less) amount of CQI indices as the primary RAT 2. For example, the quantized CQI index could include the even indices, and the mapping is made according to QCQI=div(CQI,2), where two consecutive CQIs are mapped onto one QCQI. It is noted that other mapping functions may also be applied. Next the quantized CQI values are mapped to CQI values for the primary RAT 2 (in the example value 0-7), and then mapped to CQI formats used by the primary RAT 2. If the number of indices for the secondary RAT 3 is less than or equal to the number of indices supported by the feedback transmission structure for the primary RAT 2, there is no need for quantization and the sRAT (secondary RAT) CQI index can be transmitted on the uplink "as is".

Another embodiment, with extended CQI format for the primary RAT 2 for supporting CQI indices for the secondary RAT 3, is described next. The basic approach is to extend the uplink transmission structure such that it can handle the larger number of indices (bits) required for feedback of the CQI from the secondary RAT 3. Several possibilities exist. For example, the code rate of the error correcting code used for the feedback messages can be increased, resulting in a larger payload capability. To compensate for the increased error probability due to an increased code rate, the transmission power can be increased. Another possibility is to lower the spreading factor (in case of HSPA uplink), to use multiple uplink resources (multiple channelization codes in case of HSPA, multiple "resources" as defined in 36.211 in case of LTE) or to increase the duration of the transmission (e.g. to transmit some of the bits in one subframe and the remaining bits in another subframe).

Figure 4:
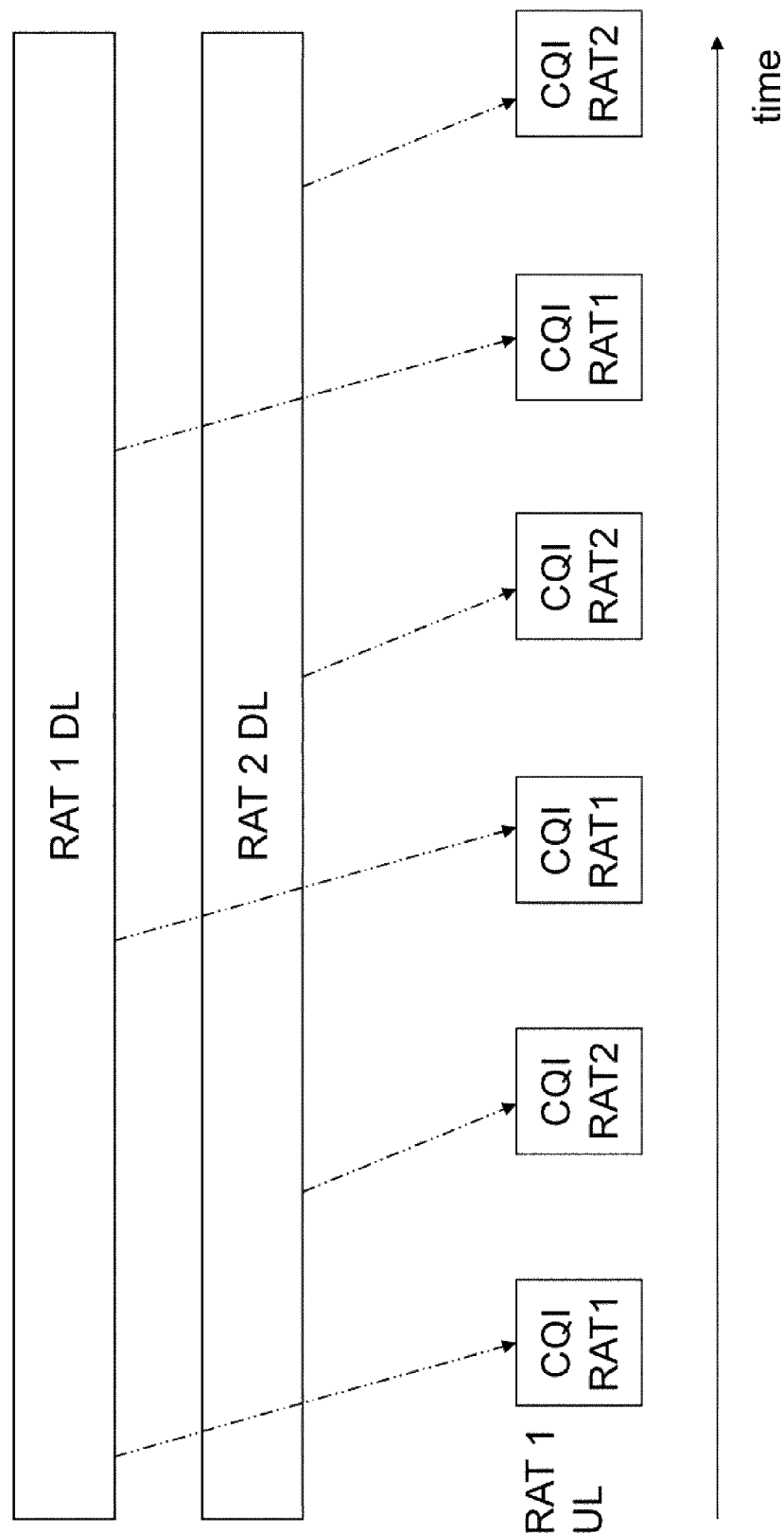
FIG. 4 illustrates time multiplexing of CQI reports.

FIG. 4 illustrates time multiplexing of CQI reports for the primary RAT 2 and the secondary RAT 3 onto a CQI format for the primary RAT 2. In particular, FIG. 4 shows a method for time multiplexing the CQI reports from both the primary and the secondary RAT 2, 3 on the CQI indicator format for the primary RAT 2. The FIG. 4 shows a time multiplexed fashion, where every second CQI report is allocated to the different RATS, respectively. A particular example: Primary/secondary RAT is reported every 10 ms, and hence the user equipment needs to transmit a CQI report every 5 ms. It is noted that also other time multiplexing principles may be used. For instance, the primary RAT 2 could be more frequently reported than the secondary RAT 3 or vice versa. The rate could be configured independently for respective RAT. This may be advantageous since different RATS typically have different transmission time interval (TTI) lengths, performance requirements or scheduling constraints (e.g. number of modulation and coding schemes) used. Alternatively, the rate could be event-triggered, based for instance on the SIR value, although such event-triggered solution would require larger modifications to existing HSPA and LTE structures.

Other multiplexing schemes are also conceivable, allowing at least partially simultaneous transmission of CQI reports from the two RATs 2, 3. For example, multiple uplink resources, one for the CQI from the primary RAT 2 and one for the CQI from the secondary RAT 3, could be used simultaneously using different resources in frequency and/or code domain. If the uplink carriers are using HSPA (also denoted "a HSPA uplink" herein), code multiplexing can be achieved by assigning different channelization codes and/or IQ (in-phase and quadrature-phase) branches to the CQIs from the primary and secondary RAT 2, 3. The spreading factor and channel code rates could in this case be chosen freely for the two CQI reports depending on their respective payload size. If the uplink carriers are using LTE (also denoted "an LTE uplink" herein), different "PUCCH resources" (Physical Uplink Control Channel) as defined in 3GPP TS 36.211 (a resource is in principle a combination of a frequency region and a spreading code) could be used. The CQI reports for the two RATs 2, 3 could also be multiplexed into a single bit stream, which in turn is coded and transmitted.

The above disclosure on CQI reporting focus on so-called periodic CQI reports, i.e. the network node, such as a base station or NodeB/eNodeB, configures periodic reporting instants. Periodic reporting is supported in both HSPA and LTE. However, LTE also supports aperiodic CQI reports, where the network node on a need basis can request the user equipment to transmit a CQI report. The resources upon which an aperiodic report is transmitted is given by the network node as part of the CQI reporting request. The structure for an aperiodic report in LTE supports (more or less) arbitrary payload sizes and can therefore support CQI reports for multiple RATs. The CQI request transmitted in the downlink could also be extended with information for which combinations of RATs CQI reports are requested (e.g. LTE only, HSPA only or both).

The invention also encompasses network node embodiments. Briefly, a network node, such as a base station or NodeB/eNodeB, receives the CQI report and determines, for instance by the timing, code or frequency allocation whether the CQI is related to the primary or secondary RAT 2, 3. In case of secondary RAT 3, the inverse mapping (according to described above) is made to determine the CQI index for the secondary RAT 3.

In the description above it has been assumed a full LTE-HSPA carrier aggregation system, i.e. where the user equipment is capable of simultaneous decoding of a first and a second RAT 2, 3. The present invention is however also applicable to the case when the user equipment is only capable to decode one RAT but CQI measurements are also needed on a second RAT. This scenario happens for example in the case fast load balancing is used. In fast load balancing, the user equipment needs to monitor another RAT and report CQI in order for the network to do fast IRAT HO (inter-RAT handover) for optimized spectrum utilization.

In an aspect thus, the invention encompasses a method 90 in a user equipment 4 for reporting a downlink channel quality in a communication system 1. The communication system 1 comprises a first radio access technology system 2, e.g. HSPA, and a second radio access technology system 3, e.g. LTE. The user equipment 4 is in connection with a network node serving a primary cell using the first radio access technology system 2. The user equipment 4 is further in connection the network node (or another network node) serving a secondary serving cell and using the second radio access technology system 3. The method 90 comprises determining 110 the channel quality for the second radio access technology system 3. This can be done in different ways, for example using pilot symbols for estimating a received SIR, as described earlier.

The method 90 further comprises mapping 120 an indicator of the channel quality to an indicator format used for channel quality indicator reports for the first radio access technology system 2. It is noted that this feature encompasses different alternatives. In particular, the first RAT 2 may use a certain format for reporting the channel quality (e.g. received SIR). The second RAT 3 may typically use another format for reporting a channel quality, but could use the same format for reporting a channel quality as the first RAT 2 uses. That is, the format used by a particular RAT, as e.g. defined in a specification relating to this particular RAT, may be the same or may differ for the different RATS. The method 90 encompasses both alternatives. Thus, the indicator of the channel quality for the second RAT 3 may be different than or be the same as the indicator of the channel quality for the first RAT 2.

The method 90 further comprises transmitting 130 the indicator of the channel quality for the second radio access technology system 3 to the communication system 1 using an uplink carrier of the first radio access technology system 2.

Example Implementations

Figure 5:
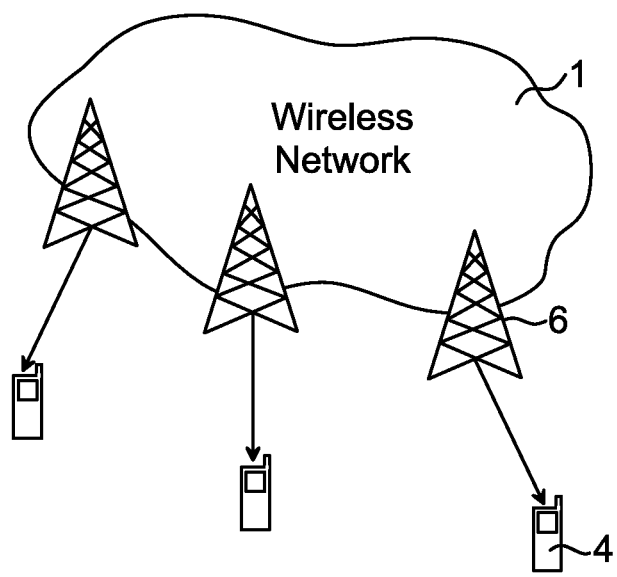
FIG. 5 illustrates schematically an environment, and in particular a communication system, in which embodiments of the invention may be implemented.

Although the described solutions may be implemented in any appropriate type of telecommunication system supporting any suitable communication standards and using any suitable components, particular embodiments of the described solutions may be implemented in an LTE network, such as that illustrated in FIG. 5.

As shown in FIG. 5, the example communication system 1 may include one or more instances of user equipment 4 and one or more network nodes or base stations 6 capable of communicating with these UEs 4, along with any additional elements suitable to support communication between UEs 4 or between a UE 4 and another communication device (such as a landline telephone). Although the illustrated UEs 4 may represent communication devices that include any suitable combination of hardware and/or software, these UEs 4 may, in particular embodiments, represent devices such as the example UE illustrated in greater detail by FIGS. 6 and 7. Similarly, although the illustrated base stations 6 may represent network nodes that include any suitable combination of hardware and/or software, these base stations 6 may, in particular embodiments, represent devices such as the example base station 6 illustrated in greater detail by FIG. 8.

Figure 6:
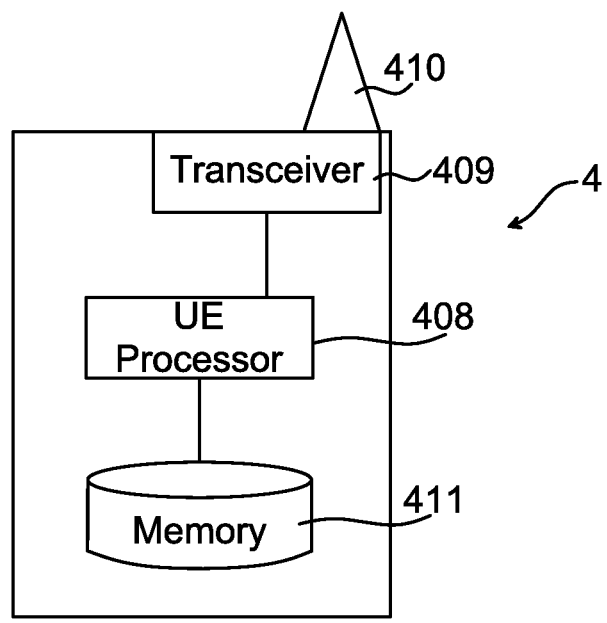
FIG. 6 illustrates schematically a user equipment suitable for implementing embodiments of the methods.

As shown in FIG. 6, the example UE 4 includes a processing circuitry or processor 408, a memory 411, a transceiver (TRX) 409, and an antenna 410. In particular embodiments, some or all of the functionality described above as being provided by mobile communication devices or other forms of UEs 4 may be provided by the UE processor executing instructions stored on a computer readable medium, such as the memory 411 shown in FIG. 6. Alternative embodiments of the UE 4 may include additional components beyond those shown in FIG. 6 that may be responsible for providing certain aspects of the UE's functionality, including any of the functionality described above and/or any functionality necessary to support the solution described above.

Figure 7:
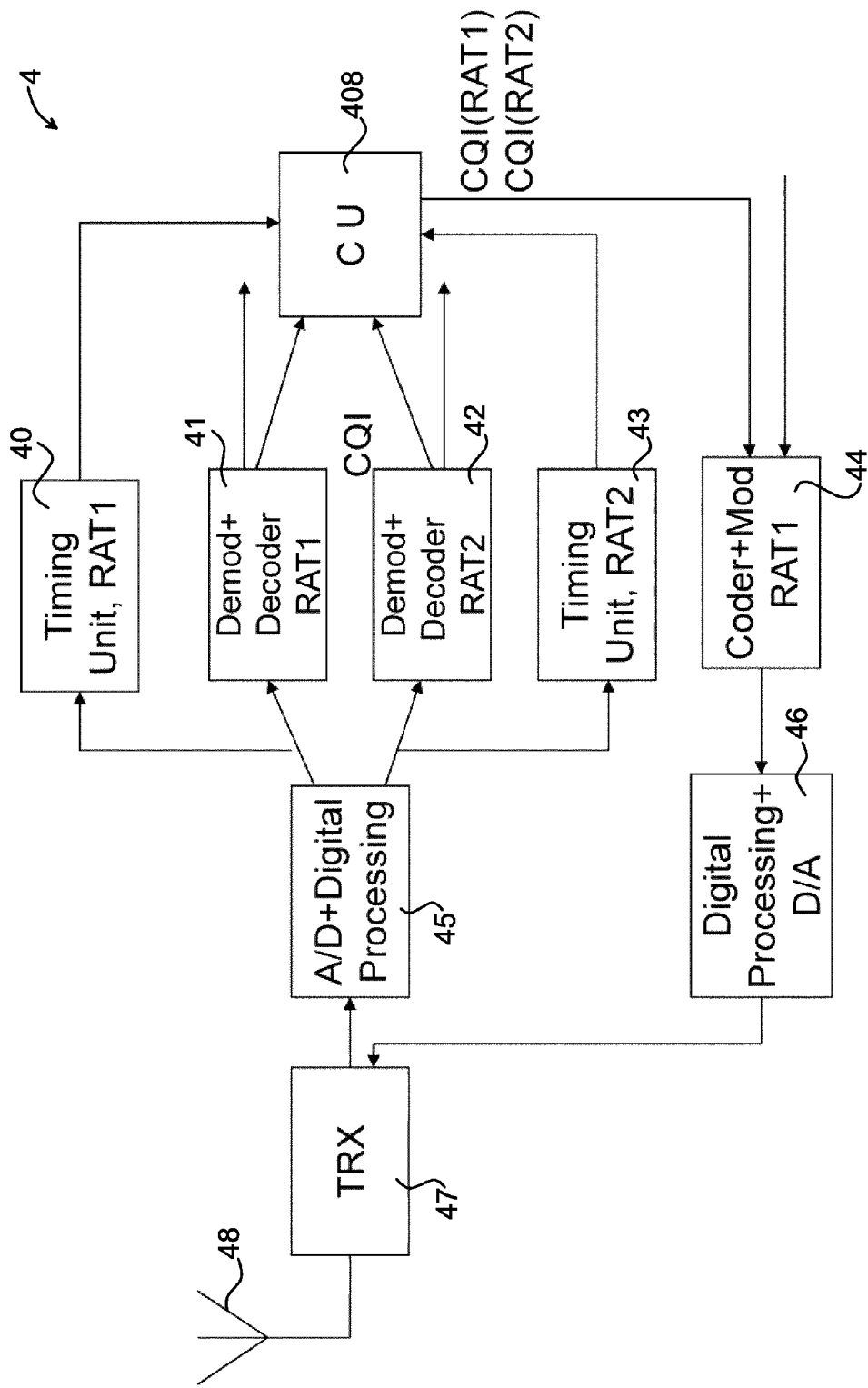
FIG. 7 illustrates a user equipment comprising functional blocks or means for implementing the methods.

FIG. 7 shows a block diagram over a UE 4 operating according to the presented disclosure. The UE 4 comprises a transceiver unit (TRX) 47 responsible for translating the radio signal to a baseband signal (and vice versa), a A/D and D/A unit 45 responsible to transforming a analog (digital) signal to a digital (analog) signal. The UE 4 also comprises demodulators and decoders 41, 42 for respective supported RAT and the UE 4 is capable to operate these demodulators and decoders simultaneously. The UE 4 further comprises timing determination units 40, 43 capable of determining the DL timing for respective RAT, and a control unit 408 that is responsible for mapping the HARQ feedback response for the secondary RAT 3 to correct UL sub frame of the primary RAT 2 according to the embodiments described. Also blocks including coders and modulators 44 for the at least the primary RAT 2 is included in the UE 4.

Figure 8:
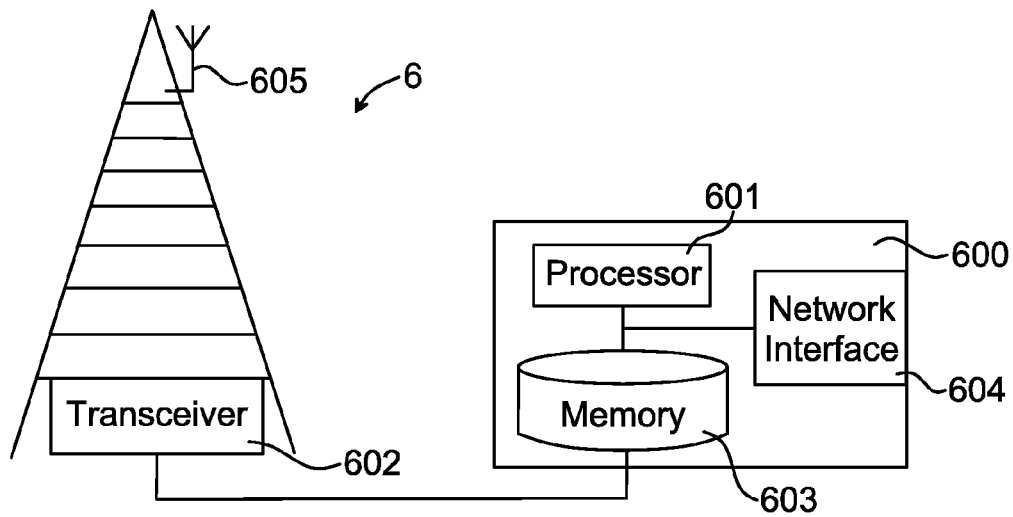
FIG. 8 illustrates an exemplifying base station comprising functional blocks or means for implementing embodiments of the methods.

As shown in FIG. 8, the example network node or base station 6 includes processing circuitry 601 or processor, a memory 603, a transceiver 602, and an antenna 605. In particular embodiments, same or all of the functionality described above as being provided by a mobile base station, a base station controller, a node B, an enhanced node B, and/or any other type of mobile communications node may be provided by the base station processor 601 executing instructions stored on a computer-readable medium, such as the memory 603 shown in FIG. 8. Alternative embodiments of the base station 6 may include additional components responsible for providing additional functionality, including any of the functionality identified above and/or any functionality necessary to support the solution described above.

Figure 9:
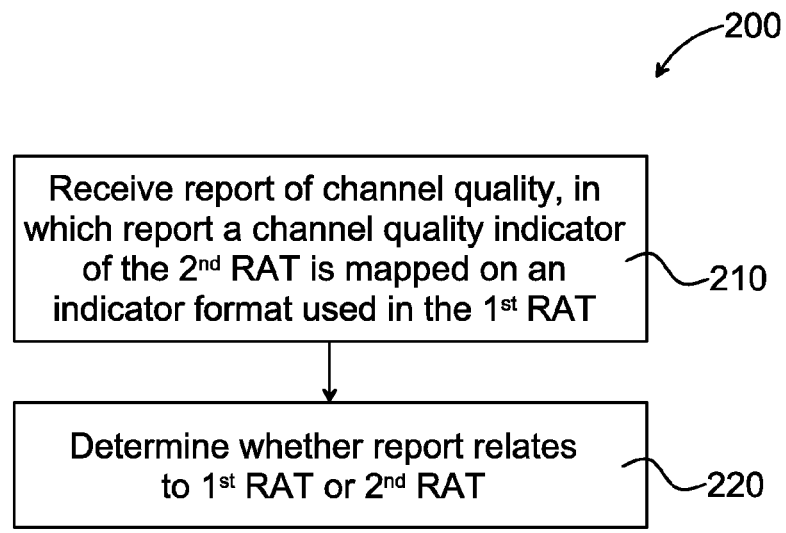
FIG. 9 is a flowchart of a method implemented in a network node.

In particular, and with reference to FIG. 9, the network node or base station 6 may be configured to perform a method 200 comprising receiving 210 a report of channel quality from the user equipment 4. In the report a channel quality indicator of the second radio access technology system 3 is mapped to an indicator format used for channel quality indicator reports for the first radio access technology system 2.

The method 200 further comprises determining 220 whether the report of channel quality relates to the first radio access technology system 2 or to the second radio access technology system 3. If the report relates to the second radio access technology system 3, the network node 6 may e.g. transmit a report further to a node e.g. handling channel allocation for the second radio access technology system 3.

In an embodiment (not shown in the FIG. 9), the method 200 further comprises making, for a report of channel quality relating to the second radio access technology system 3, a mapping of the channel quality indicator of the second radio access technology system 3 for determining the channel quality indicator for the second radio access technology system 3. The mapping could for example be an inverse mapping.

In an embodiment, the determining whether the report of channel quality relates to the first radio access technology system 2 or to the second radio access technology system 3 is based on timing, code and/or frequency allocation.

The invention claimed is:

1. A method, in a user equipment, for reporting a downlink channel quality in a communication system, the communication system comprising a first radio access technology system and a second radio access technology system, the user equipment being in connection with both a primary serving cell of the first radio access technology system and a secondary serving cell of the second radio access technology system, the method comprising:

determining a channel quality for the second radio access technology system;

mapping the channel quality to an indicator index of the channel quality having an indicator format used for channel quality indicators of the second radio access technology system;

mapping the indicator index of the channel quality having the indicator format of the second radio access technology system to an indicator format used for channel quality indicators of the first radio access technology system; and transmitting, to the primary serving cell of the first radio access technology system on an uplink carrier, the indicator index of the channel quality for the second radio access technology system of the communication system using the indicator format of the first radio access technology system.

2. The method of claim 1, wherein the mapping the indicator index of the channel quality of the second radio access technology system comprises adapting the indicator format used for the channel quality indicators of the second radio access technology system to the indicator format used for the channel quality indicators of the first radio access technology system.

3. The method of claim 1, wherein the determining the channel quality comprises estimating the channel quality for the second radio access technology system.

4. The method of claim 1, comprising:
   determining a channel quality for the first radio access technology system;
   mapping the channel quality for the first radio access technology system to an indicator index of the channel quality having an indicator format used for channel quality indicators of the first radio access technology system; and
   wherein the transmitting comprises:
      transmitting, to the primary serving cell of the first radio access technology system on an uplink carrier, an indicator index of the channel quality for the first radio access technology system; and
      wherein the indicator index of the channel quality for the first radio access technology system and the indicator index of the channel quality for the second radio access technology system are time multiplexed on the uplink channel of the first radio access technology system.

5. The method of claim 1:
   wherein a number of channel quality indicator indices for the second radio access technology system is greater than a number of channel quality indicator indices for the first radio access technology system;
   wherein the mapping the channel quality comprises estimating the indicator index of the channel quality for the second radio access technology system, resulting in a first channel quality indicator index; and
   wherein the mapping the indicator index of the channel quality comprises quantizing the first channel quality indicator index to a quantized channel quality indicator table for the second radio access technology system, wherein a number of indices of the quantized channel quality indicator table for the second radio access technology system is no more than a number of indices of a quantized channel quality indicator table for the first radio access technology system.

6. The method of claim 1:
   wherein a number of channel quality indicator indices of a quantized channel quality indicator table for the second radio access technology system is greater than a number of channel quality indicator indices of a quantized channel quality indicator table for the first radio access technology system; and
   wherein the mapping the indicator index of the channel quality for the second radio access technology system comprises using an extended uplink transmission structure of the first radio access technology system for handling the greater number of indices required for the second radio access technology system.

7. The method of claim 6, wherein using the extended uplink transmission structure comprises increasing a code rate of error correcting code used for the indicator index of the channel quality for the second radio access technology system using the indicator format of the first radio access technology system.

8. The method of claim 7, further comprising increasing the transmission power for compensating for an increased error probability due to the increased code rate.

9. The method of claim 6, wherein using the extended uplink transmission structure comprises one of:
   lowering a spreading factor;
   using multiple uplink resources or increasing the duration of the transmission; and
   increasing the duration of the transmission by transmitting some of a number of channel quality indicator indices in one sub-frame and the remaining channel quality indicator indices in another sub-frame.

10. The method of claim 1:
    wherein a number of the indicator indices of the channel quality for the second radio access technology system is equal to a number of the indicator indices of the channel quality for the first radio access technology system; and
    wherein the mapping the indicator index of the channel quality for the second radio access technology system comprises using the indicator index of the channel quality having the indicator format of the second radio access technology as is.

11. The method of claim 1, wherein said mapping includes mapping the indicator index of the channel quality having the indicator format of the second radio access technology system to an indicator index having an indicator format used for channel quality indicators of the first radio access technology system.

12. A user equipment configured to operate in a communication system, the communication system comprising a first radio access technology system and a second radio access technology system, the user equipment configured for connection with both a primary serving cell of the first radio access technology system and a secondary serving cell of the second radio access technology system, the user equipment comprising:
    one or more processing circuits configured to:
       determine a channel quality for the second radio access technology system;
       map the channel quality to an indicator index of the channel quality having an indicator format of the second radio access technology system;
       map the indicator index of the channel quality having the indicator format of the second radio access technology system to an indicator format used for channel quality indicators in the first radio access technology system; and
    a transmitter configured to transmit, to the primary serving cell of the first radio access technology system on an uplink carrier, the indicator index of the channel quality for the second radio access technology system to the communication system by using the indicator format of the first radio access technology.

13. The user equipment of claim 12, wherein the one or more processing circuits are configured to map the indicator index of the channel quality of the second radio access technology system by adapting the indicator format used for the channel quality indicators of the second radio access technology system to the indicator format used for the channel quality indicators of the first radio access technology system.

14. The user equipment of claim 12, wherein the one or more processing circuits are configured to determine the channel quality by estimating the channel quality for the second radio access technology system.

15. The user equipment of claim 12:
wherein the one or more processing circuits are further configured to:
  determine a channel quality for the first radio access technology system; and
  map the channel quality for the first radio access technology system to an indicator index of the channel quality having an indicator format used for channel quality indicators of the first radio access technology system;
wherein the transmitter is further configured to transmit, to the primary serving cell of the first radio access technology system on the uplink carrier, the indicator index of the channel quality for the first radio access technology system; and
wherein the indicator of channel quality for the first radio access technology system and the indicator of the channel quality for the second radio access technology system are time multiplexed on the uplink channel for the first radio access technology system.

16. The user equipment of claim 12:
wherein a number of channel quality indicator indices for the second radio access technology system is greater than a number of channel quality indicator indices for the first radio access technology system; and
wherein the one or more processing circuits are configured to:
  map the channel quality by estimating the indicator index of the channel quality for the second radio access technology system, resulting in a first channel quality indicator index; and
  map the indicator index of the channel quality by quantizing the first channel quality indicator index to a quantized channel quality indicator table for the second radio access technology system, wherein a number of indices of the quantized channel quality indicator table for the second radio access technology system is no more than a number of indices of a quantized channel quality indicator table for the first radio access technology system.

17. The user equipment of claim 12:
wherein a number of channel quality indicator indices of a quantized channel quality indicator table for the second radio access technology system is greater than a number of channel quality indicator indices of a quantized channel quality indicator table for the first radio access technology system; and
wherein the one or more processing circuits are configured to map the indicator index of the channel quality for the second radio access technology system includes using an extended uplink transmission structure of the first radio access technology system for handling the greater number of indices required for the second radio access technology system.

18. The user equipment of claim 17, wherein the one or more processing circuits are configured to use the extended uplink transmission structure by increasing a code rate of error correcting code used for the indicator index of the channel quality for the second radio access technology system using the indicator format of the first radio access technology system.

19. The user equipment of claim 18, the one or more processing circuits are further configured to increase the transmission power for compensating for an increased error probability due to the increased code rate.

20. The user equipment of claim 17, wherein the one or more processing circuits are configured to use the extended uplink transmission structure by one of:
  lowering a spreading factor;
  using multiple uplink resources or increasing the duration of the transmission; and
  increasing the duration of the transmission by transmitting some of the channel quality indicator indices in one sub-frame and the remaining channel quality indicator indices in another sub-frame.

21. The user equipment of claim 12:
wherein a number of the indicator indices of the channel quality for the second radio access technology system is equal to a number of the indicator indices of the channel quality for the first radio access technology system; and
wherein the one or more processing circuits are configured to map the indicator index of the channel quality for the second radio access technology system includes using the indicator index of the channel quality having the indicator format of the second radio access technology as is.

22. A method, in a network node of a communication system, the communication system comprising a first radio access technology system, a second radio access technology system, and a user equipment in connection with both a primary serving cell of the first radio access technology system and a secondary serving cell of the second radio access technology system, the method comprising:
  receiving, from the user equipment, a report of channel quality, the report including an indicator index of a channel quality of the user equipment in the second radio access technology system and having the channel quality mapped to an indicator format used for channel quality indicators of the second radio access technology system that is then mapped to an indicator format used for channel quality indicators of the first radio access technology system; and
  determining whether the report of channel quality relates to the first radio access technology system or to the second radio access technology system.

23. The method of claim 22, further comprising making, for a report of channel quality relating to the second radio access technology system, a mapping of the channel quality indicator index of the second radio access technology system for determining the channel quality indicator index for the second radio access technology system.

24. The method of claim 23, wherein the mapping is an inverse mapping.

25. The method of claim 22, wherein the determining whether the report of channel quality relates to the first radio access technology system or to the second radio access technology system is based on at least one of timing, code, and frequency allocation.

26. A network node of a communication system, the communication system comprising a first radio access technology system, a second radio access technology system, and user equipment in connection with both a primary serving cell of the first radio access technology system and a secondary serving cell of the second radio access technology system, the network node comprising:
  a receiver configured to receive, from the user equipment, a report of channel quality, the report including an indicator index of a channel quality of the user equipment in the second radio access technology system and having the channel quality mapped to an indicator format used for channel quality indicators of the second radio access technology that is then mapped to an indicator format used for channel quality indicators of the first radio access technology system; and one or more processing circuits configure to determine whether the report of channel quality relates to the first radio access technology system or to the second radio access technology system.

27. The network node of claim 26, wherein the one or more processing circuits are configured to make, for a report of channel quality relating to the second radio access technology system, a mapping of the channel quality indicator index of the second radio access technology system for determining the channel quality indicator index for the second radio access technology system.

28. The network node of claim 27, wherein the mapping is an inverse mapping.

29. The network node of claim 26, wherein the one or more processing circuits are configured to determine whether the report of channel quality relates to the first radio access technology system or to the second radio access technology system based on at least one of timing, code, and frequency allocation.

* * * * *

UNITED STATES PATENT AND TRADEMARK OFFICE
CERTIFICATE OF CORRECTION

PATENT NO. : 9,642,026 B2  
APPLICATION NO. : 14/119254  
DATED : May 2, 2017  
INVENTOR(S) : Ericson et al.

Page 1 of 1

It is certified that error appears in the above-identified patent and that said Letters Patent is hereby corrected as shown below:

In the Specification

In Column 2, Line 35, delete "RATS" and insert -- RATs --, therefor.

In Column 9, Line 43, delete "RATS," and insert -- RATs, --, therefor.

In Column 9, Line 50, delete "RATS" and insert -- RATs --, therefor.

In Column 11, Line 5, delete "RATS." and insert -- RATs. --, therefor.

Signed and Sealed this  
Fifteenth Day of August, 2017

Joseph Matal  
*Performing the Functions and Duties of the  
Under Secretary of Commerce for Intellectual Property and  
Director of the United States Patent and Trademark Office*